(12) United States Patent
Akasaka et al.

(10) Patent No.: US 10,880,135 B2
(45) Date of Patent: Dec. 29, 2020

(54) SEMICONDUCTOR DEVICE AND COMMUNICATION

(71) Applicant: RENESAS ELECTRONICS CORPORATION, Tokyo (JP)

(72) Inventors: Motoo Akasaka, Tokyo (JP); Satoshi Kaneko, Tokyo (JP); Naoki Aono, Tokyo (JP); Yutaka Watanabe, Tokyo (JP); Takayuki Kokawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/450,358

(22) Filed: Jun. 24, 2019

(65) Prior Publication Data
US 2020/0007364 A1 Jan. 2, 2020

(30) Foreign Application Priority Data
Jul. 2, 2018 (JP) .................................. 2018-125926

(51) Int. Cl.
*H04L 27/10* (2006.01)
*H04L 25/49* (2006.01)

(52) U.S. Cl.
CPC .............................. *H04L 25/4923* (2013.01)

(58) Field of Classification Search
CPC . H04L 27/2332; H04L 27/2057; H04L 67/04; H03M 7/46; H03M 7/00

USPC ......................................................... 375/280
See application file for complete search history.

(56) References Cited

U.S. PATENT DOCUMENTS

2018/0041331 A1* 2/2018 Hosaka ..................... H04L 7/00
2019/0305795 A1* 10/2019 Marpe ..................... H03M 7/00

FOREIGN PATENT DOCUMENTS

JP           2004-207942 A       7/2004

* cited by examiner

*Primary Examiner* — Khai Tran
(74) *Attorney, Agent, or Firm* — McDermott Will & Emery LLP

(57) ABSTRACT

In the conventional semiconductor device, the power consumed in ternary serial data communication cannot be reduced.
According to one embodiment, the semiconductor device has a the transmission processing circuit 10 that converts the binary representation of binary Transmitted data Dbin_TX to a ternary transmitted data Dter_TX represented as a ternary number and generates a transmitted signal corresponding to this ternary Transmitted data Dter_TX, wherein the transmission processing circuit 10 verifies the frequency of occurrence of the values included in the ternary transmitted data Dter_TX, assigns the signal change pattern with the highest state transition to the transmitted signal logical level corresponding to the lowest occurrence value, and generates a transmitted signal.

12 Claims, 15 Drawing Sheets

FIG. 2

Table for explaining the operation of the decoder and the second encoder of the first embodiment

| Binary data | Ternary data | |
|---|---|---|
| | T1 | T0 |
| 000 | 0 | 0 |
| 001 | 0 | 1 |
| 010 | 0 | 2 |
| 011 | 1 | 0 |
| 100 | 1 | 1 |
| 101 | 1 | 2 |
| 110 | 2 | 0 |
| 111 | 2 | 1 |

FIG. 3
Example of sending data "01111000100000" (binary)
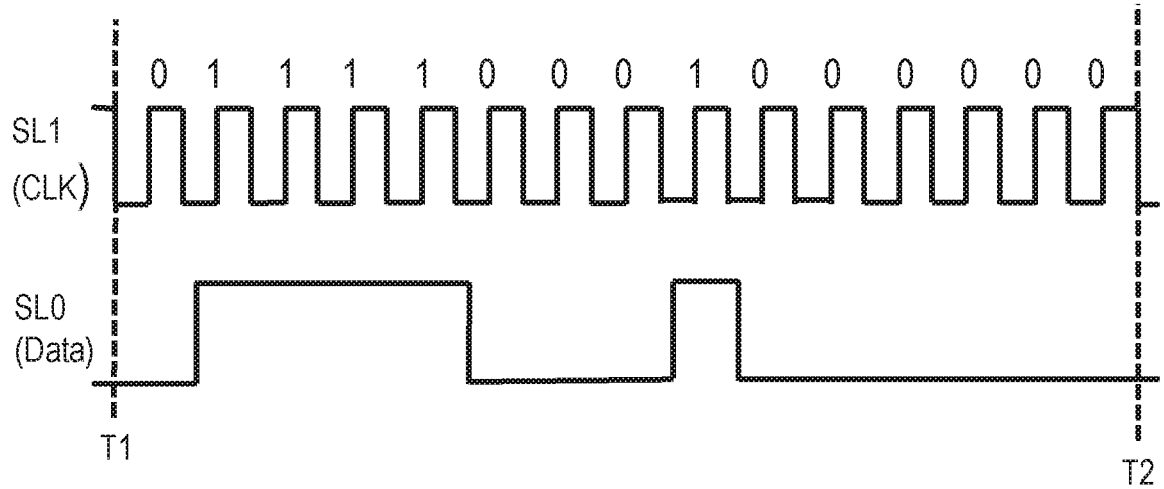
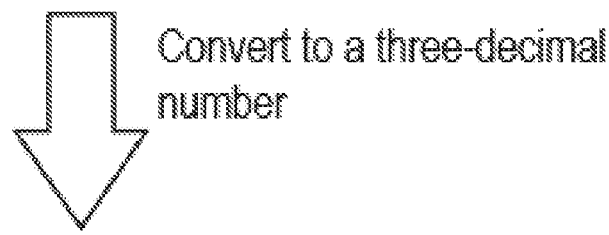
Convert to a three-decimal number
Example of sending transmission data "102001000" (ternary)
(No data modulation table applied)
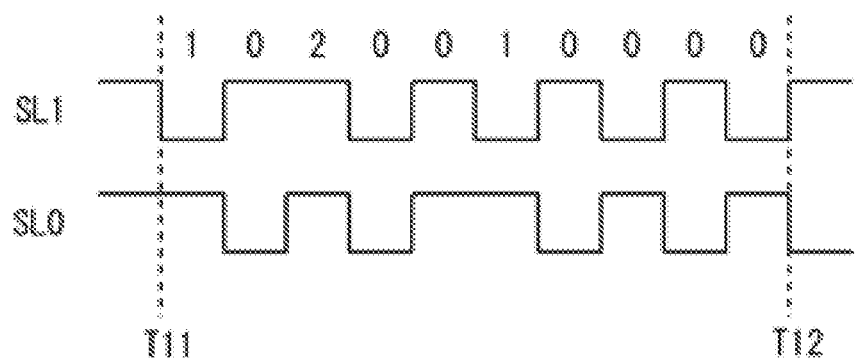

FIG. 4

Data modulation table A/data demodulation table A

| Ternary number | Modulation pattern | |
| --- | --- | --- |
| | SL1 | SL0 |
| 0 | Change | Change |
| 1 | Change | Not Change |
| 2 | Not Change | Change |

Data modulation table B/data demodulation table B

| Ternary number | Modulation pattern | |
| --- | --- | --- |
| | SL1 | SL0 |
| 0 | Change | Not Change |
| 1 | Change | Change |
| 2 | Not Change | Change |

Data modulation table C/data demodulation table C

| Ternary number | Modulation pattern | |
| --- | --- | --- |
| | SL1 | SL0 |
| 0 | Not Change | Change |
| 1 | Change | Not Change |
| 2 | Change | Change |

*FIG. 11*

Example of a decode table/encode table used in the semiconductor device according to the second embodiment

| Binary data | Ternary data | |
|---|---|---|
| | T1 | T0 |
| 000 | 0 | 0 |
| 001 | 0 | 1 |
| 010 | 1 | 0 |
| 011 | 1 | 1 |
| 100 | 2 | 0 |
| 101 | 2 | 1 |
| 110 | 1 | 2 |
| 111 | 0 | 2 |

Rows 000–011: Low toggle region
Rows 100–111: High toggle region

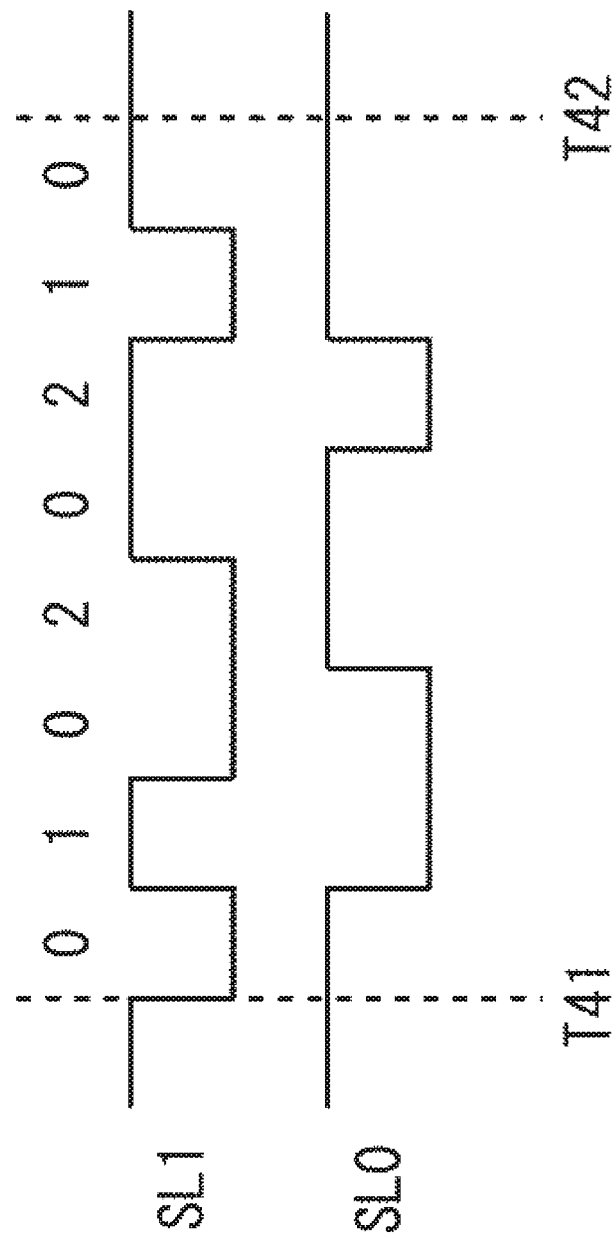

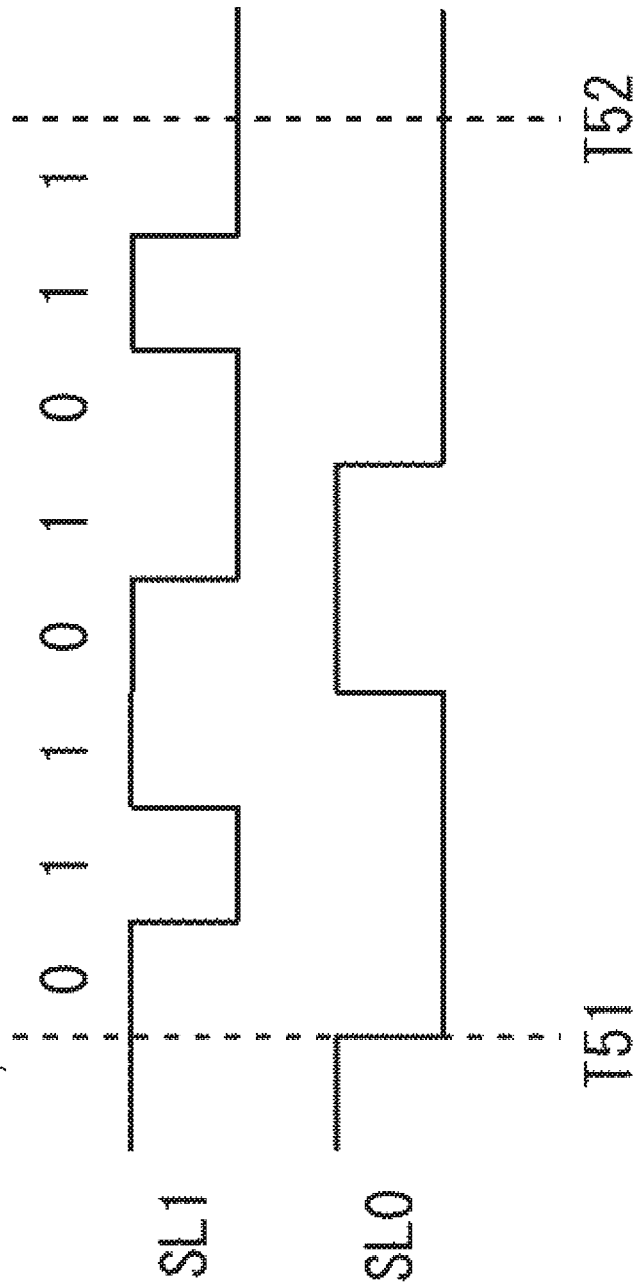

SEMICONDUCTOR DEVICE AND COMMUNICATION

CROSS-REFERENCE TO RELATED APPLICATIONS

The disclosure of Japanese Patent Application No. 2018-125926 filed on Jul. 2, 2018 including the specification, drawings and abstract is incorporated herein by reference in its entirety.

BACKGROUND

The present invention relates to a semiconductor device and a communication system, for example, to a semiconductor device and a communication system for transmitting and receiving ternary data represented by a ternary number using two communication lines.

In data transfer technology, there is serial data communication for serially transferring data. In this serial data communication, the power consumption varies depending on the value of data to be transmitted. More specifically, a large amount of power is consumed when the level of the signal changes such that the data to be transferred changes from 0 to 1, or from 1 to 0. Therefore, a technique for reducing power consumption in serial data communication is disclosed in Japanese unexamined Patent Application publication 2004-207942.

The data transfer device described in Japanese unexamined Patent Application publication 2004-207942 includes a transmitted data inverting means for inverting the transmitted serial data and an inverting information adding means for adding the inverting information indicating whether or not the inverting information is performed to the transmitted serial data when the number of bits having either a predetermined high level or a low level is larger than half of the total number of bits in the transmission serial data to be transmitted over the bus. As a result, in the data transfer apparatus described in Japanese unexamined Patent Application publication 2004-207942, the state transition of the serial data to be transferred is reduced, and the power consumption is reduced.

SUMMARY

In recent years, however, in serial data communication, a data transfer technique (hereinafter referred to as ternary serial data communication) using a ternary number is used. In this ternary serial data communication, when expressing three values, transmitted signal transitions are used in which the logical level of one of the two signal lines is changed, or the signal levels of both of the two signal lines are changed. Therefore, as in the data transfer apparatus described in Japanese unexamined Patent Application publication 2004-207942, data transfer cannot be performed correctly by simply inverting the change in the logic level of the signal corresponding to the value to be signaled. Therefore, even with the technique of Patent Document 1, the power consumption in the ternary serial data communication cannot be reduced.

Other objects and novel features will become apparent from the description of this specification and the accompanying drawings.

According to one embodiment, the semiconductor device has the transmission processing circuit of converting a binary transmitted data to a ternary transmitted data represented by a ternary number to generate a transmitted signal corresponding to this ternary transmitted data, and the transmission processing circuit verifies the frequency of the values contained in the ternary Transmitted data and assigns the signal change pattern with the highest number of state transitions to the transmitted signal logical levels corresponding to the lowest frequency values to generate transmitted signal.

According to the first embodiment, when ternary transmitted data is transmitted, regardless of the content of the data to be transmitted, the power consumed by the semiconductor device can be reduced by minimizing the change in the status of the signal lines at all times.

BRIEF DESCRIPTION OF THE DRAWINGS

FIG. 2 is a diagram illustrating the operation of a decoder and a second encoder of a semiconductor device according to the first embodiment;

FIG. 3 is a timing chart illustrating an example of a transmitted signal waveform when performing serial communication in a communication system according to the first embodiment;

FIG. 4 is a diagram illustrating an example of a data modulation table and a data demodulation table used in the transmitting device and the receiving device according to the first embodiment;

FIG. 11 is a diagram illustrating an example of the decoding table used in the transmitting device according to the second embodiment and the encoding table used in the receiving device;

FIG. 14 is a transmitted signal timing chart for transmitting a ternary transmitted data generated by decoding using the default code table by the transmitting device according to the second embodiment.

FIG. 15 is a transmitted signal timing chart for transmitting ternary transmitted data generated by decoding process using the decoding table selected according to the data transition of binary transmitted data by the transmitting device according to the second embodiment.

DETAILED DESCRIPTION

Figure 1:
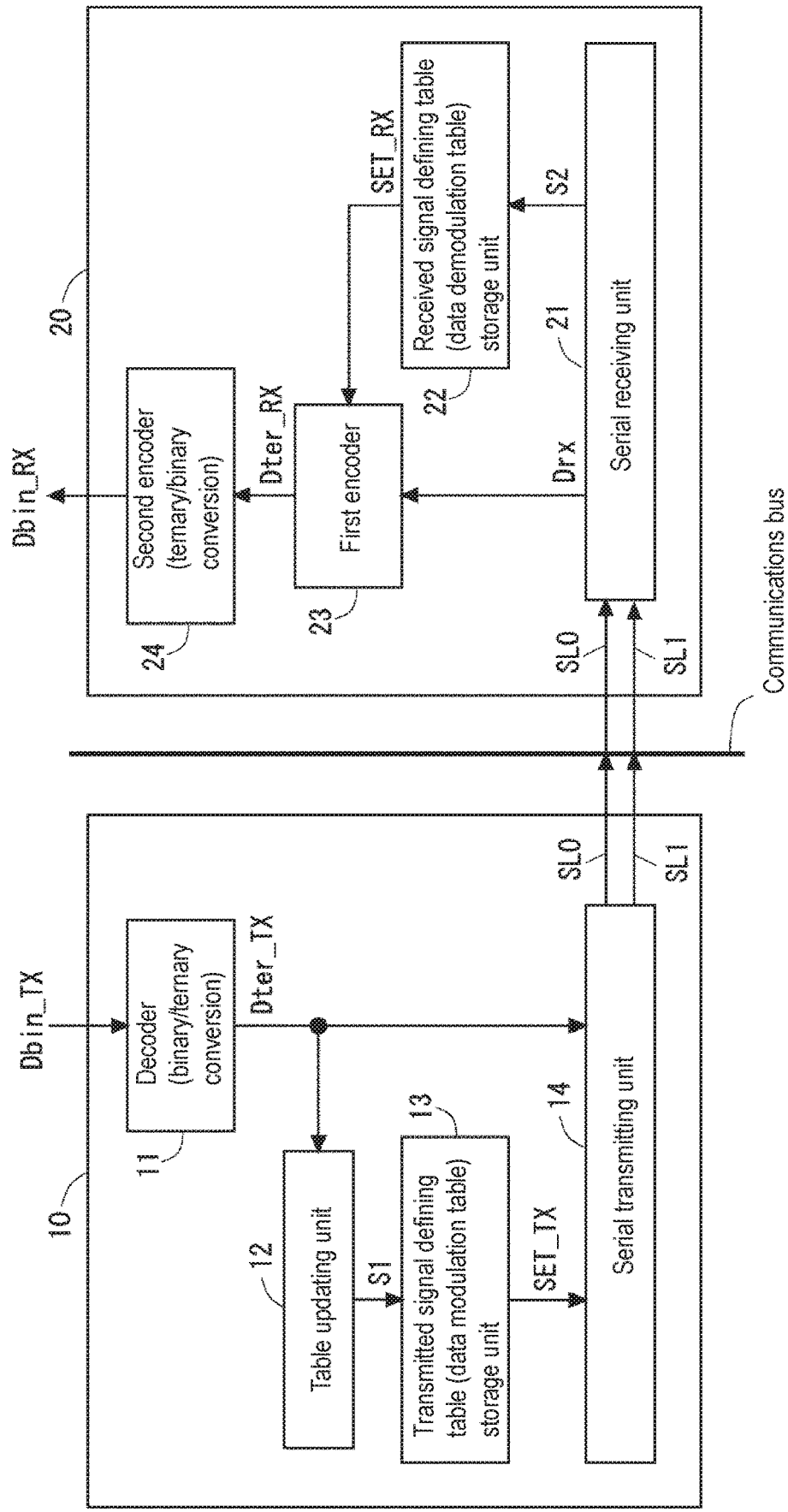
FIG. 1 is a block diagram of a communication system including a semiconductor device according to a first embodiment.

For clarity of explanation, the following description and drawings are appropriately omitted and simplified. In addition, the respective elements described in the drawings as functional blocks for performing various processes can be configured by a CPU (Central Processing Unit), a memory, and other circuits in terms of hardware, and are realized by programs loaded in the memory in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

FIG. 1 is a block diagram of a communication system 1 including the semiconductor device according to the first embodiment. As shown in FIG. 1, the communication system 1 according to the first embodiment includes a transmitting device including the transmission processing circuit 10 and the receiving device including the reception processing circuit 20. The transmitting device and the receiving device are communicably connected by communication buses.

The transmitting device is a semiconductor device including an arithmetic processing unit or the like for generating binary transmitted data Dbin_TX supplied to the transmission processing circuit 10, and the transmission processing circuit 10. The receiving device is a semiconductor device including an arithmetic processing unit and the like for performing processing on the binary received data Dbin_RX outputted from the reception processing circuit 20, and the reception processing circuit 20. In the following description, only the transmission processing circuit 10 and the reception processing circuit 20, which are one of the features, are shown, and description of other components is omitted. The storage unit for holding various kinds of information in the transmission processing circuit 10 and the reception processing circuit 20 does not need to be provided in the transmission processing circuit 10 and the reception processing circuit 20, for example, and a part of the area of the non-volatile memory such as the flash memory in the transmitting device and the receiving device may be used.

As shown in FIG. 1, the transmission processing circuit 10 includes decoders 11, a table updating unit 12, a transmitted signal definition table storage unit 13, and a Serial transmitting unit 14. In addition, the transmission processing circuit 10 transmits communication data to the reception processing circuit 20 by a transmitted signal outputted through the first signal line SL0 and the second signal line SL1. The transmission processing circuit 10 has a first terminal as a terminal to which the first signal line SL0 is connected, and has a second terminal as a terminal to which the second signal line SL1 is connected.

The decoders 11 convert the binary transmitted data Dbin_TX represented by a binary number into ternary Transmitted data Dter_TX represented by a ternary number. The table updating unit 12 updates a transmitted signal definition table (e.g., a data modulation table) by applying a definition value having many changes in logical levels of transmitted signal to a change definition value of transmitted signal corresponding to a value having the lowest occurrence frequency among the ternary values representing the ternary transmitted data Dter_TX.

The transmitted signal definition table storage unit 13 stores a transmitted signal definition table, for example, a data modulation table. This data modulation table is a table defining how the logical levels of the transmitted signal transmitting the first signal line SL0 and the second signal line SL1 are changed in accordance with the respective values of the ternary transmitted data Dter_TX. That is, in the data modulation table, a value included in the ternary value and a change definition value corresponding to the value are described in association with each other. As will be described in detail later, in the transmission processing circuit 10 according to the first embodiment, a plurality of data modulation tables differing in the combinations of the ternary values and the change definition values corresponding to the ternary values are used.

In the transmission processing circuit 10 according to the first embodiment, as a method of updating the data modulation table by the table updating unit 12, a method of switching a table selected from a plurality of data modulation tables is employed. However, as a method of updating the data modulation table by the table updating unit 12, a method of directly rewriting the description content of the data modulation table in accordance with the content of the ternary transmitted data Dter_TX can be adopted. The table updating unit 12 of the transmission processing circuit 10 according to the first embodiment selects, from a plurality of data modulation tables, a data modulation table in which a change definition value corresponding to a value having the lowest occurrence frequency among the ternary values representing the ternary transmitted data Dter_TX is a definition value having many changes in logical levels of transmitted signal, and provides the selected data modulation table to the Serial transmitting unit. Specifically, the table updating unit 12 outputs the modulation table code S 1 specifying the data modulation table to be selected, and the transmitted signal definition table storage unit 13 outputs the data modulation table corresponding to the modulation table code S1 to the Serial transmitting unit 14.

The Serial transmitting unit 14 outputs the communication data including the ternary transmitted data Dter_TX by changing the voltage levels of the transmitted signal transmitting the first signal line SL0 and the second signal line SL1 based on the transmitted signal defining table (e.g., data modulating table) and the ternary transmitted data Dter_TX. As will be described later in detail, the Serial transmitting unit 14 generates communication data including the modulation table code S1 and the ternary transmitted data Dter_TX, and outputs transmitted signal based on the communication data.

The reception processing circuit 20 includes a Serial receiving unit 21, a received signal definition table storage unit 22, a first encoder 23, and a second encoder 24. In addition, the reception processing circuit 20 receives communication data from the transmission processing circuit 10 by a transmitted signal inputted from the first signal line SL0 and the second signal line SL1. The reception processing circuit 20 has a first terminal as a terminal to which the first signal line SL0 is connected, and has a second terminal as a terminal to which the second signal line SL1 is connected.

Serial receiving unit 21 receives communication data including ternary transmitted data Dter_TX represented by a ternary number via a first signal line SL0 and a second signal line SL1 and transmits it to subsequent circuitry. The Serial receiving unit 21 outputs the modulation table code S2 of the data included in the communication data to the received signal definition table storage unit 22, and outputs the received data Drx corresponding to the ternary transmitted data included in the communication data to the first encoder 23.

The received signal definition table storage unit 22 stores a received signal definition table, for example, a data demodulator table. Here, the data demodulation table is a table showing the relationship between the change pattern of the logical level of the received signal being input by transmitting the first signal line SL0 and the second signal line SL1 when the ternary transmitted data is received and the respective values of the ternary number corresponding to the change pattern. In other words, the data demodulating table describes a data demodulating table in which a change definition value defining patterns of voltage-level changes of received signal and a ternary value corresponding to the change definition value are associated with each other. As will be described in detail later, in the reception processing circuit 20 according to the first embodiment, a plurality of data demodulating tables differing in the combinations of the ternary values and the change defining values corresponding to the ternary values are used.

In the reception processing circuit 20 according to the first embodiment, a method of switching a table selected from a plurality of data demodulation tables is employed as a method of switching the data demodulation table outputted from the received signal definition table storage unit 22. The Serial receiving unit 21 of the reception processing circuit 20 according to the first embodiment gives the modulation table code included in the received communication data to the received signal definition table storage unit 22, thereby switching the data demodulating table outputted from the received signal definition table storage unit 22. It is assumed that the plurality of data demodulation tables stored in the received signal definition table storage unit 22 include the same content as the plurality of data modulation tables prepared in the transmitting device, and that the tables designated by the modulation code table codes of the same values include the same content.

The first encoder 23 converts the received signal (e.g., received data Drx) received by the Serial receiving unit 21 into a ternary received data Dter_RX represented by a ternary number in accordance with the received signal definition table (e.g., data demodulating table) supplied from the received signal definition table storage unit 22. The second encoder 24 converts the ternary received data Dter_RX into a binary received data Dbin_RX represented by a binary number.

Here, in the communication system 1 according to the first embodiment, the transmission processing circuit 10 and the reception processing circuit 20 are configured so that the two communication systems can be switched. Specifically, the communication system 1 according to the first embodiment switches between the first communication method based on the I2C (Inter Integrated Circuit) standard for communicating data using the binary transmitted data and the synchronous clock of the binary transmitted data using the two signal lines and the second communication method based on the I3C (Improved Inter Integrated Circuit) standard for communicating ternary transmitted data due to the difference in the signal change pattern of the two signal lines. Accordingly, in the communication system 1 according to the first embodiment, a transmitted signal of the communication system 1 in which the same data is transmitted by the first communication method and the second communication method will be described.

In the communication system 1 according to the first embodiment, when communication is performed by the first transmitting method, the binary transmitted data is converted into serial data, the serial data is transmitted to the first signal line SL0, and the synchronization clocks of the serial data are transmitted to the second signal line SL1. Further, in the communication system 1 according to the first embodiment, when the communication is performed by the second transmitting method, the binary transmitted data is converted into the ternary transmitted data, and the signal levels of the first signal line SL0 and the second signal line SL1 are changed based on the signal change patterns set for the respective values of the ternary transmitted data, thereby transmitting the ternary transmitted data from the transmission processing circuit 10 to the reception processing circuit 20.

Accordingly, a method for converting a binary number to a ternary number in the communication system 1 according to the first embodiment will be described. In the communication system 1 according to the first embodiment, the decoder 11 of the transmission processing circuit 10 converts a binary number to a ternary number, and the second encoder 24 of the reception processing circuit 20 converts a ternary number to a second binary number. FIG. 2 is a table for explaining the operations of the decoder 11 and the second encoder 24 of the semiconductor device according to the first embodiment.

In the case shown in FIG. 2, a combination of three consecutive values of binary data represented by binary numbers is described in a first column on the left side, and a combination of two consecutive values of ternary data represented by ternary numbers is described in a second column on the right side. The values in the second column are represented by a combination of three values (e.g., 0, 1, 2) constituting a ternary number.

Then, the decoder 11 sets a value of three bits from the head of the inputted binary transmitted data Dbin_TX as one data group, refers to a row in which three consecutive values included in the data group coincide with the value of the first column, and outputs the data described in the second column of the referenced row as the ternary transmitted data Dter_TX corresponding to the data group to be converted.

In addition, the second encoder 24 sets a value of two symbols from the head of the inputted ternary received data Dter_RX as one data group, refers to a row in which two consecutive values included in the data group coincide with the value of the second column, and outputs the data described in the first column of the referenced row as the binary received data Dbin_RX corresponding to the data group to be converted.

For example, when one data group of the binary transmitted data Dbin_TX is "010", the decoder 11 outputs "02" as the ternary transmitted data Dter_TX corresponding to the binary transmitted data Dbin_TX. When one data group of the ternary received data Dter_RX is "02", the second encoder 24 outputs "010" as the binary received data Dbin_RX corresponding to the ternary transmitted data Dter_RX.

Next, the difference between the waveform of transmitted signal when the communication system 1 according to the first embodiment performs communication in the first communication method and the waveform of transmitted signal when the communication system 1 performs communication in the second communication method will be described. FIG. 3 is a timing chart showing examples of waveforms of transmitted signal when serial communication is performed in the communication system 1 according to the first embodiment.

In FIG. 3, timing charts showing signal changes of the first signal line SL0 and the second signal line SL1 when binary transmitted data "011110000000000" (timings T1 to T2) is transmitted in accordance with the first communication method (for example, the I2C standard) are shown on the upper side. In addition, timing charts showing signal changes of the first signal line SL0 and the second signal line SL1 when the ternary transmitted data "10200100000" (timing T11 to T12) having the binary Transmitted data "01111000000000" as a ternary number according to the transformation rules shown in the tables shown in FIG. 2 is transmitted in accordance with the second communication method (for example, the I3C standard) are shown on the lower side.

As shown in FIG. 3, when the communication system 1 performs communication based on the first communication method, the voltage level of the first signal line SL0 is changed so as to be low level when "0" is transmitted and to be high level when "1" is transmitted. When communication is performed based on the first communication method, a clock signal is outputted to the second signal line SL1, and a change in signal level of the first signal line SL0 is synchronized with a falling edge or a rising edge of the clock signal.

On the other hand, when the communication system 1 performs communication based on the second communication system, the voltage level of both the first signal line SL0 and the second signal line SL1 is changed when "0" is transmitted, the voltage level of only the second signal line SL1 is changed when "1" is transmitted, and the voltage level of only the first signal line SL0 is changed when "2" is transmitted.

In the embodiment shown in FIG. 3, in the first communication system, the number of toggles of the first signal line SL0 and the second signal line SL1 is 19 when 15-bit binary Transmitted data is transmitted. On the other hand, when a ternary transmitted data corresponding to binary Transmitted data is transmitted by the second communication method, the number of toggles of the first signal line SL0 and the second signal line SL1 is 17. That is, when the same data is transmitted by the second communication method, the total number of toggles of the first signal line SL0 and the second signal line SL1 tends to be reduced. In the first communication method and the second communication method, since the number of values transmitted by the second communication method is smaller, the communication time tends to be shorter. Therefore, the second communication method can reduce power consumed by toggling the first signal line SL0 and the second signal line SL1 as compared with the first communication method.

However, even when communication using the second communication method is performed by the communication system 1, the power consumption may be increased more than that of the first communication method depending on the type of data to be transmitted. More specifically, when the ratio of the transmitted data to the value for toggling both the first signal line SL0 and the second signal line SL1 (in the example shown in FIG. 3, "0") increases, the consumed power tends to increase. Therefore, in the communication system 1 according to the first embodiment, the data modulation method is changed according to transmitted data so as to reduce the number of times that both of the two signal lines are toggled in the transmitted signal. Hereinafter, a method of varying the data modulation method in the communication system 1 according to the first embodiment will be described.

In the communication system 1 according to the first embodiment, by using three data modulation tables and data demodulation tables whose ternary values differ due to a status change that simultaneously changes the first signal line SL0 and the second signal line SL1, the number of toggles of the transmitted signal at the time of communication is reduced. FIG. 4 is a diagram illustrating examples of a data modulation table and a data demodulation table used in the transmitting device 10 and the receiving device 20 according to the first embodiment.

In the example shown in FIG. 4, three tables are shown: a data modulation table A/a data demodulation table A, a data modulation table B/a data demodulation table B, and a data modulation table C/a data demodulation table C. In these tables, any one of the ternary values is defined in the left-hand column, the change definition values (modulation patterns) indicating changes in the voltage levels of the two signal lines are defined in the right-hand column, and the definition values described in the same row correspond to each other.

The data modulation table A/data demodulation table A is assigned a change definition value that simultaneously changes the first signal line SL0 and the second signal line SL1 to a ternary number of "0". The data modulation table B/data demodulation table B is assigned a change definition value that simultaneously changes the first signal line SL0 and the second signal line SL1 to the ternary number of "1". The data modulation table C/data demodulation table C is assigned a change definition value that simultaneously changes the first signal line SL0 and the second signal line SL1 to the ternary number of "2". In any of the tables, the change definition value in which the first signal line SL0 and the second signal line SL1 do not change at the same time is a change definition value in which only one of the first signal line SL0 and the second signal line SL1 changes. As shown in FIG. 4, the data modulation table and the data demodulation table specified by the same value (e.g., labels A to C) have the same content. The labels A to C are modulation table codes to be described later.

The data modulation table is stored in the transmitted signal definition table storage unit 13, and the data demodulation table is stored in the received signal definition table storage unit 22. The tables can be stored in the transmitted signal definition table storage unit 13 and the received signal definition table storage unit 22, for example, from the outside in the transmitting device and the receiving device memories. It is also preferable that these tables are stored prior to the initiation of the transmitting device and the receiving device operations or at the time of shipping.

Figure 5:
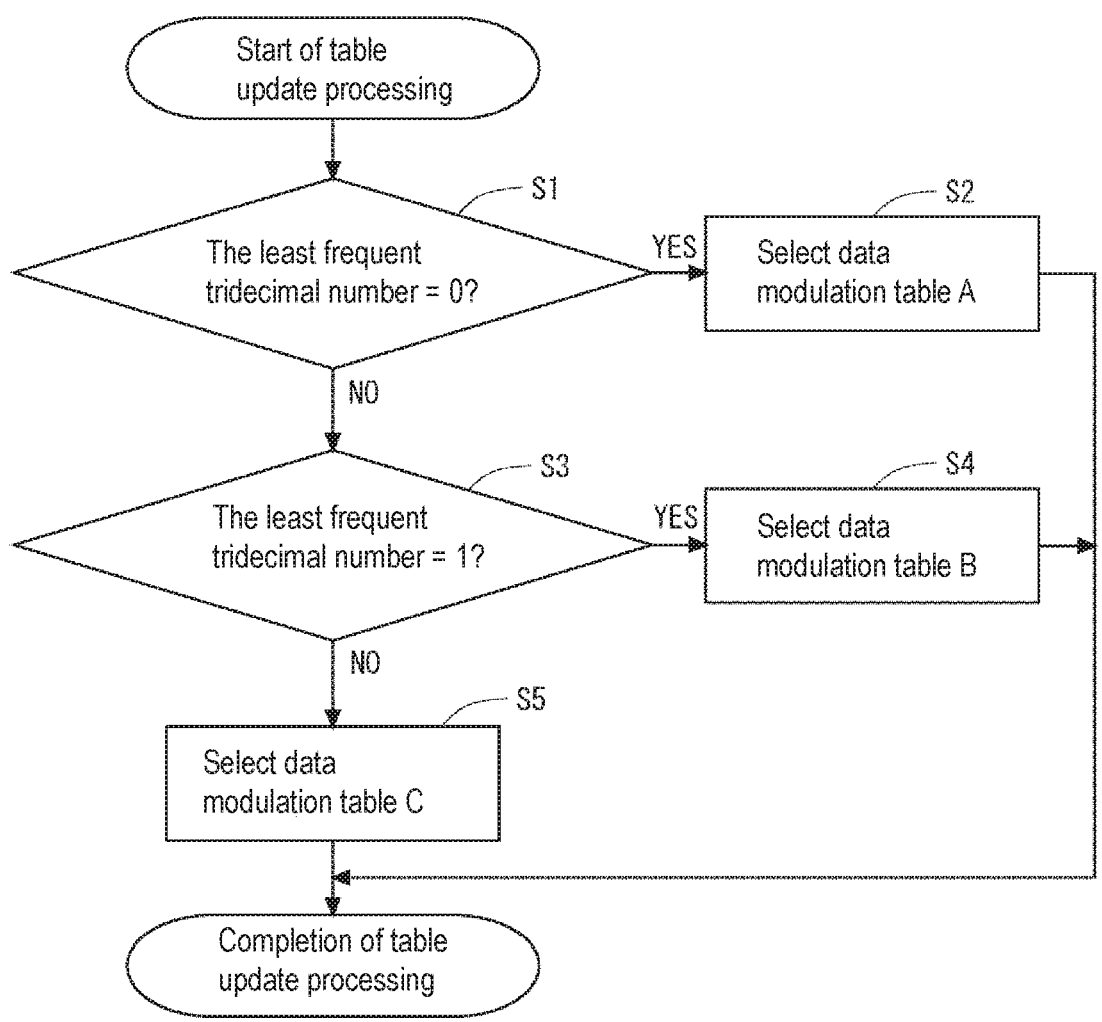
FIG. 5 is a flowchart illustrating an update process of a data modulation table according to the transmitting device according to the first embodiment.

Next, a table switching method applied to the transmission processing circuit 10 according to the first embodiment will be described. This switching is mainly performed by the table updating unit 12. FIG. 5 is a flow chart for explaining the process of updating the data modulation table in the transmitting device 10 according to the first embodiment.

As shown in FIG. 5, the table updating unit 12 according to the first embodiment analyzes the ternary transmitted data Dter_TX. Then, the table updating unit 12 outputs a modulation table code S1 specifying a modulation table to be given to the Serial transmitting unit 14 based on the analysis result. The table updating unit 12 analyzes the ternary transmitted data Dter_TX to specify the ternary values with the lowest frequency of occurrence. If the ternary number having the lowest occurrence frequency is 0, the modulation table code S1 indicating the data modulation table A is outputted to the transmitted signal definition table storage unit 13 in steps S1 and S2. As a result, the transmitted signal definition table storage unit 13 outputs the data modulation table A to the Serial transmitting unit 14. When the ternary number having the lowest occurrence frequency is 1, the table updating unit 12 outputs the modulation table code S1 indicating the data modulation table B to the transmitted signal definition table storage 13 in steps S3 and S4. As a result, the transmitted signal definition table storage unit 13 outputs the data modulation table B to the Serial transmitting unit 14.

When the ternary number having the lowest occurrence frequency is 2, the table updating unit 12 outputs the modulation table code S1 indicating the data modulation table C to the transmitted signal definition table storage 13 in steps S3 and S5. As a result, the transmitted signal definition table storage unit 13 outputs the data modulation table C to the Serial transmitting unit 14.

Figure 6:
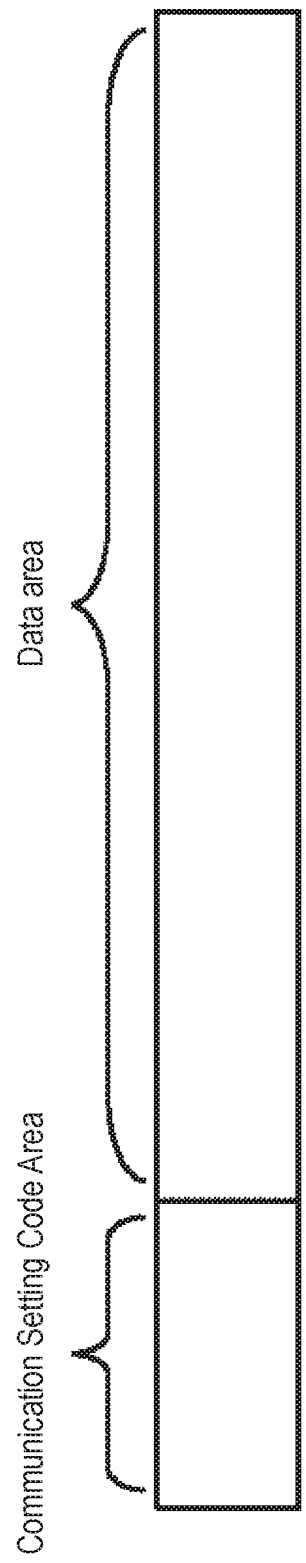
FIG. 6 is a diagram illustrating a data format of the communication data used in the communication system according to the first embodiment.

In the communication system 1 according to the first embodiment, the transmission processing circuit 10 switches the data modulation table to be applied to the data at the time of transmission in accordance with the content of the Transmitted data, but in order to perform the communication correctly, the type of the modulation table applied at the time of transmission needs to be specified in the reception processing circuit 20. Therefore, in the communication system 1 according to the first embodiment, the ternary transmitted data Dter_TX and the editing table code used for modulating the ternary transmitted data Dter_TX are included in the communication data. FIG. 6 is a diagram illustrating a data format of communication data used in the communication system 1 according to the first embodiment.

As shown in FIG. 6, a Communication Setting Code Area for storing a modulated table code and a data area for storing ternary Transmitted data are defined in the communication data. After receiving the communication data, the reception processing circuit 20 recognizes the modulation table code applied to the ternary Transmitted data stored in the data area by referring to the modulation table code stored in the Communication Setting Code Area. Then, the reception processing circuit 20 encodes the ternary Transmitted data Drx based on the recognition to generate the ternary received data Dter_RX.

Figure 7:
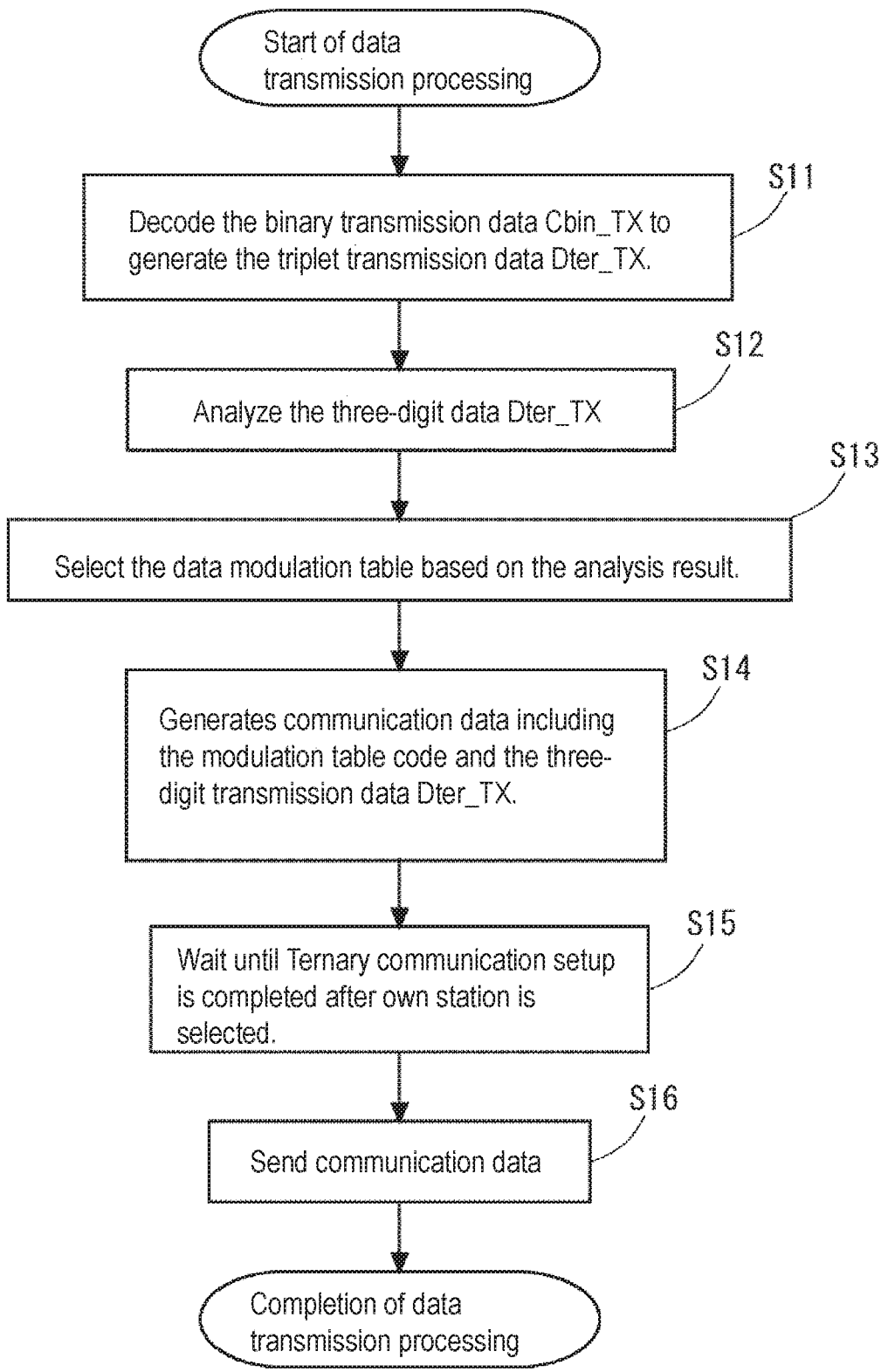
FIG. 7 is a flow chart illustrating a data transmission process according to the transmitting device according to the first embodiment.

Next, the data transmitting process in the transmission processing circuit 10 according to the first embodiment will be described. FIG. 7 is a flow chart for explaining the data transmitting process in the transmitting device 10 according to the first embodiment.

As shown in FIG. 7, in the transmission processing circuit 10 according to the first embodiment, the binary transmitted data Dbin_TX is converted into ternary transmitted data Dter_TX by the decoders 11 (S11). In step S1, the decoder 11 converts the binary transmitted data Dbin_TX into the ternary transmitted data Dter_TX using the table described in FIG. 4.

Next, in the transmission processing circuit 10 according to the first embodiment, the ternary Transmitted data Dter_TX is analyzed by the table updating unit 12 in operation S12. In step S13, the table updating unit 12 selects a data modulation table based on the analysis result in step S12. Specifically, in operation S13, the table updating unit 12 selects a table to which a change defined value having the smallest frequency of occurrence among the values in the ternary Transmitted data Dter_TX is assigned the change defined value having the smallest change in status.

In step S14, the Serial transmitting unit 14 generates communication data including the modulation table code, which specifies the data modulation table selected in step S13, in the Communication Setting Code Area. The data area of the communication data includes the ternary Transmitted data Dter_TX modulated by applying the data modulation table selected in S13. Then, the transmission processing circuit 10 according to the first embodiment waits until the setting of the Ternary communication (communication based on the I3C standard) is completed after the own station is selected from the communication buses (S15). Then, after the communication setting is completed, the Serial transmitting unit 14 outputs transmitted signal as the communication data to transmit the communication data in operation S16.

Figure 8:
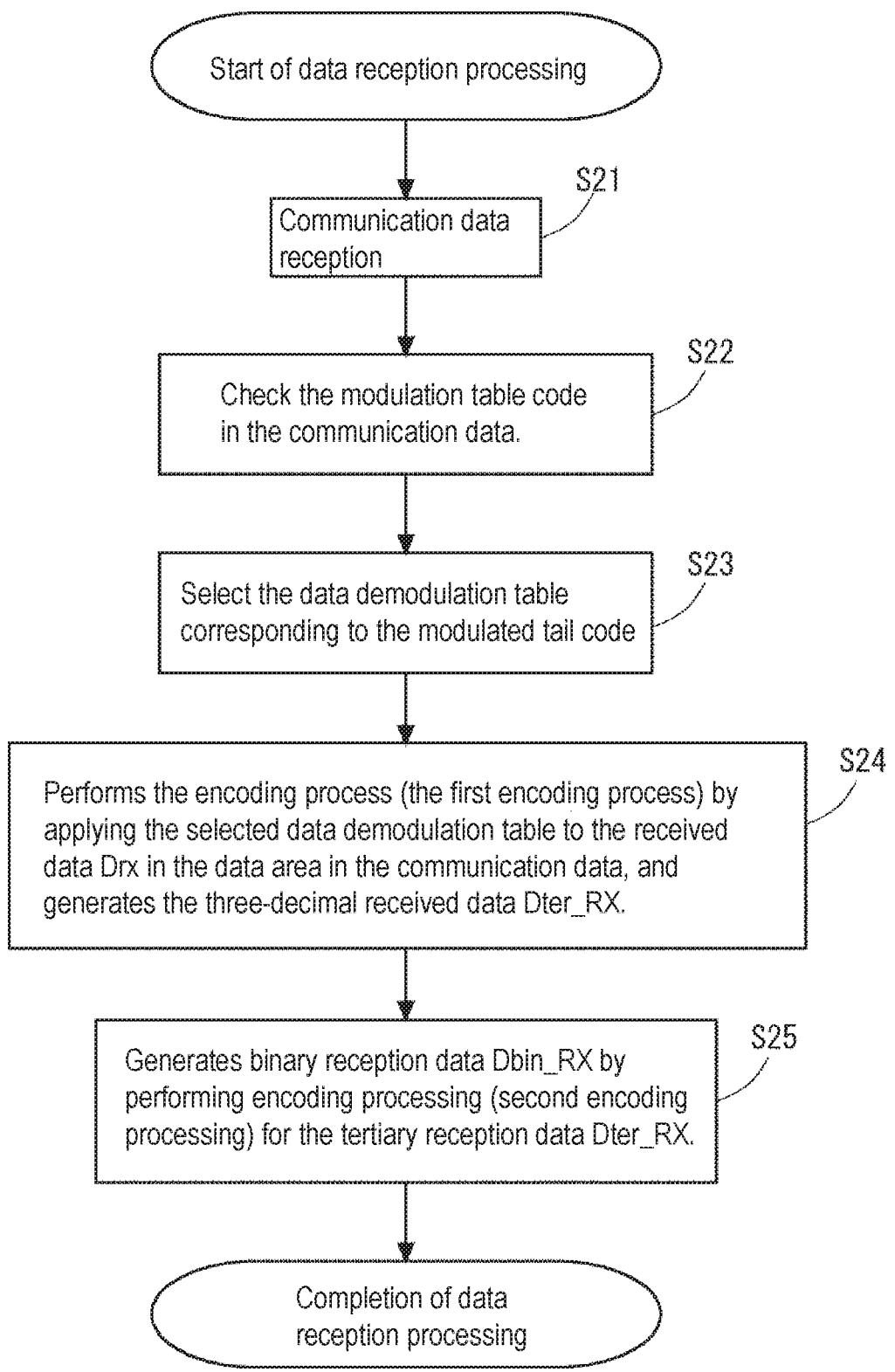
FIG. 8 is a flow chart illustrating a data reception process according to the receiving device according to the first embodiment.

Next, the data reception process in the reception processing circuit 20 according to the first embodiment will be described. FIG. 8 is a flow chart for explaining the data reception process in the reception processing circuit 20 according to the first embodiment.

As shown in FIG. 8, in the reception processing circuit 20 according to the first embodiment, the Serial receiving unit 21 first receives communication data in operation S21. In operation S22, the Serial receiving unit 21 checks the modulation table code in the communication data. In operation S23, the Serial receiving unit 21 outputs the confirmed modulation table code to the received signal definition table storage unit 22, selects the data demodulation table specified by the modulation table code supplied to the received signal definition table storage unit 22, and outputs the selected data demodulation table to the first encoder 23.

Next, in the reception processing circuit 20 according to the first embodiment, the first encoder 23 performs encoding processing (first encoding processing) on the received data Drx based on the data demodulation table provided in step S23 to generate ternary received data Dter_RX (step S24). Then, the reception processing circuit 20 according to the first embodiment performs encoding processing (second encoding processing) on the ternary received data Dter_RX by the second encoder 24 to generate binary received data Dbin_RX (S25).

The transmission processing circuit 10 and the reception processing circuit 20 according to the first embodiment perform transmission and reception of data by the operation as described above, thereby establishing communication while switching the modulation methods applied to the Transmitted data. Here, waveforms of transmitted signal when the data modulation table is switched in the communication system 1 according to the first embodiment will be described.

Figure 9:
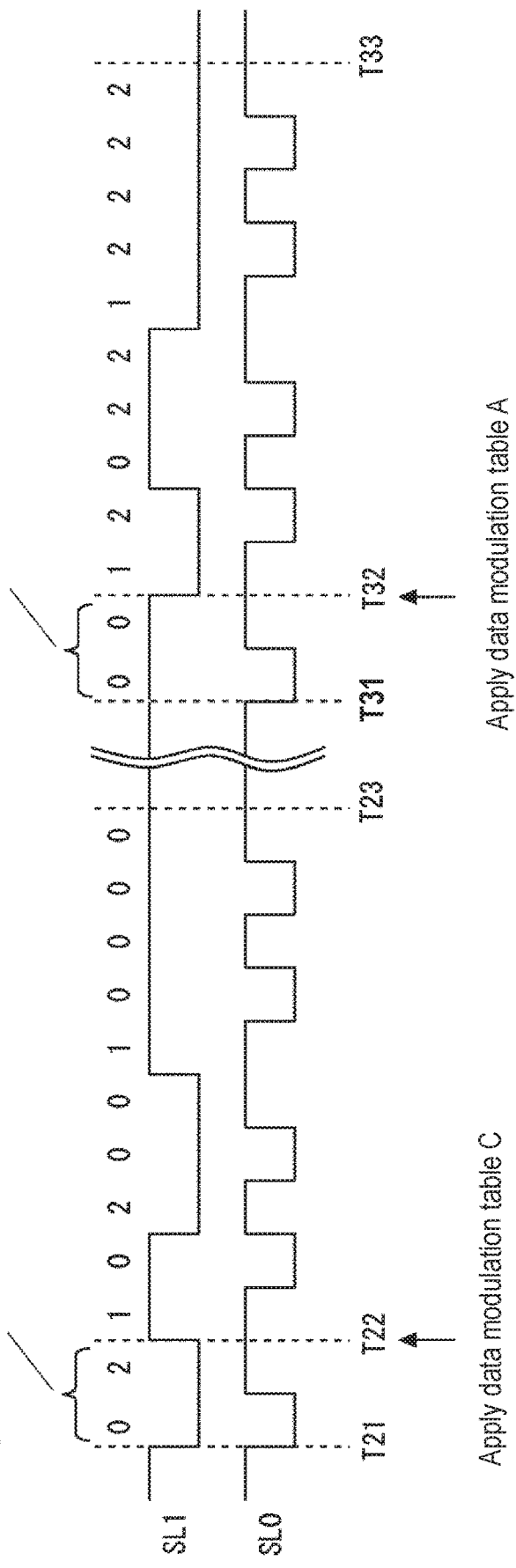
FIG. 9 is a timing chart illustrating an example of a transmitted signal waveform when communicating communication data represented by a ternary number in a communication system according to the first embodiment.

FIG. 9 is a timing chart showing exemplary waveforms of transmitted signal when communication data represented by ternary values is communicated in the communication system 1 according to the first embodiment. In the embodiment shown in FIG. 9, ternary transmitted data Dter_TX subjected to data modulation by applying data modulation table C is transmitted at timings T22 to T23, and ternary transmitted data Dter_TX subjected to data modulation by applying data modulation table C is transmitted at timings T32 to T33.

As shown in FIG. 9, in the communication system 1 according to the first embodiment, the modulation table code is transmitted at a timing (e.g., timing T21 to T22 and timing T31 to T32) prior to transmitting the ternary transmitted data Dter_TX. The received signal definition table storage unit 22 determines the modulation table code received in the current communication cycle according to the translation rules described in the received signal definition table specified by the modulation table code received in the previous communication cycle. Then, the received signal definition table storage unit 22 selects a data demodulation table to be applied to the received data drivers received in the current communication cycles based on the determination result. Therefore, the Serial transmitting unit 14 generates communication data by applying the data modulation table applied to the ternary transmitted data in the previous communication cycles to the modulation table code stored in the Communication Setting Code Area of the communication data.

In the embodiment shown in FIG. 9, the modulation table code for specifying the data modulation table C using the data modulation tables. A of the timings T21 to T22 is transmitted signal. Then, ternary transmitted data modulated by applying the data modulation table C is transmitted during timings T22 to T23. One difference between the data modulation table A and the data modulation table C is that the two signal lines are toggled together when the value "0" is transmitted in the data modulation table A, and the two signal lines are toggled together when the value "2" is transmitted in the data modulation table C.

In the embodiment shown in FIG. 9, the modulation table code for specifying the data modulation table A using the data modulation table C at timings T31 to T32 is transmitted signal. Then, ternary transmitted data modulated by applying the data modulation table A is transmitted during timings T32 to T33. As shown in FIG. 9, in the communication system 1 according to the first embodiment, by performing such data communication, the change pattern of the transmitted signal outputted by the transmission processing circuit 10 at the timings T22 to T23 is a pattern in which two signal lines toggle simultaneously when transmitting "2" of the lowest frequency of appearance. Further, in the communication system 1 according to the first embodiment, by switching the data modulation table, at timings T32 to T33, the change pattern of the transmitted signal outputted by the transmission processing circuit 10 is a pattern in which the two signal lines toggle simultaneously when transmitting the "0" having the smallest frequency of appearance.

As described above, the communication system 1 according to the first embodiment includes a transmitting device, a transmitting device, and a receiving device that communicates with the communication system 1 via the first signal line SL0 and the second signal line SL1. The transmitting device has a the transmission processing circuit 10 which receives a binary transmitted data Dbin_TX represented by a binary number, generates a ternary transmitted data Dter_TX represented by the binary transmitted data Dbin_TX in a ternary number, and sends a ternary number to the receiving device by a combination of a change in the logical level of the signal transmitting the first signal line SL0 and the second signal line SL1. The receiving device comprises a reception processing circuit 20 for encoding the received ternary transmitted data Dter_RX to generate a binary received data Dbin_RX corresponding to the binary transmitted data Dbin_TX and represented in binary.

When transmitting the ternary transmitted data Dter_TX using the first state edge in which the logical levels of the signals transmitting the first signal line SL0 and the second signal line SL1 both change, the second state edge in which one of the first signal line SL0 and the second signal line SL1 changes, and the third state edge in which the other of the first signal line SL0 and the second signal line SL1 changes, the transmission processing circuit 10 converts the binary transmitted data Dbin_TX into the ternary transmitted data Dter_TX so that the probability of occurrence of the first state edge becomes the smallest regardless of the value of the binary transmitted data Dbin_TX.

As described above, in the communication system 1 according to the first embodiment, the transmission processing circuit 10 analyzes the value included in the ternary transmitted data Dter_TX generated from the binary transmitted data Dbin_TX, and selects the data modulation table to which the defined value having the smallest occurrence frequency of the ternary number having the largest change in the logical level of the transmitted signal is assigned. Then, the transmission processing circuit 10 outputs a transmitted signal corresponding to the ternary transmitted data Dter_TX based on the selected data modulation table.

Thus, in the communication system 1 according to the first embodiment, the communication system 1 can perform communication in which the number of toggles of the two signals constituting the transmitted signal is minimized at all times regardless of the values included in the ternary transmitted data Dter_TX. In addition, by reducing the number of toggles of signals at the time of communication in this manner, it is possible to reduce the power consumed by the transmission processing circuit 10. In addition, by reducing the number of times of toggling of the signal at the time of communication, the communication system 1 according to the first embodiment can reduce EMI noise that occurs even when the logic level of the signal changes.

In the communication system 1 according to the first embodiment, the reception processing circuit 20 recognizes the data modulation table applied to the received data by referring to the modulation table code included in the communication data. Then, the reception processing circuit 20 applies a data demodulating table including the same content as the recognized data modulating table to encode the received data Drx included in the received communication data, thereby generating the ternary received data Dter_RX having the same content as the ternary transmitted data Dter_TX prepared in the transmission processing circuit 10. As a result, the communication system 1 according to the first embodiment can prevent erroneous transmission of data from the transmission processing circuit 10 to the reception processing circuit 20.

In addition, in the transmission processing circuit 10 and the reception processing circuit 20 according to the first embodiment, tables used in the ternary transmitted data modulation processing and demodulation processing are prepared in advance, and the tables to be selected are switched according to the content of the ternary transmitted data. Thus, in the communication system 1 according to the first embodiment, it is possible to reduce the arithmetic processing required for switching the modulation method or the demodulation method.

In the second embodiment, the communication system 2 including the transmission processing circuit 30 and the reception processing circuit 40, which are different forms of the transmission processing circuit 10 and the reception processing circuit 20, will be described. In the description of Embodiment Mode 2, the same components as those of Embodiment Mode 1 are denoted by the same reference numerals as those of Embodiment Mode 1, and description thereof is omitted.

Figure 10:
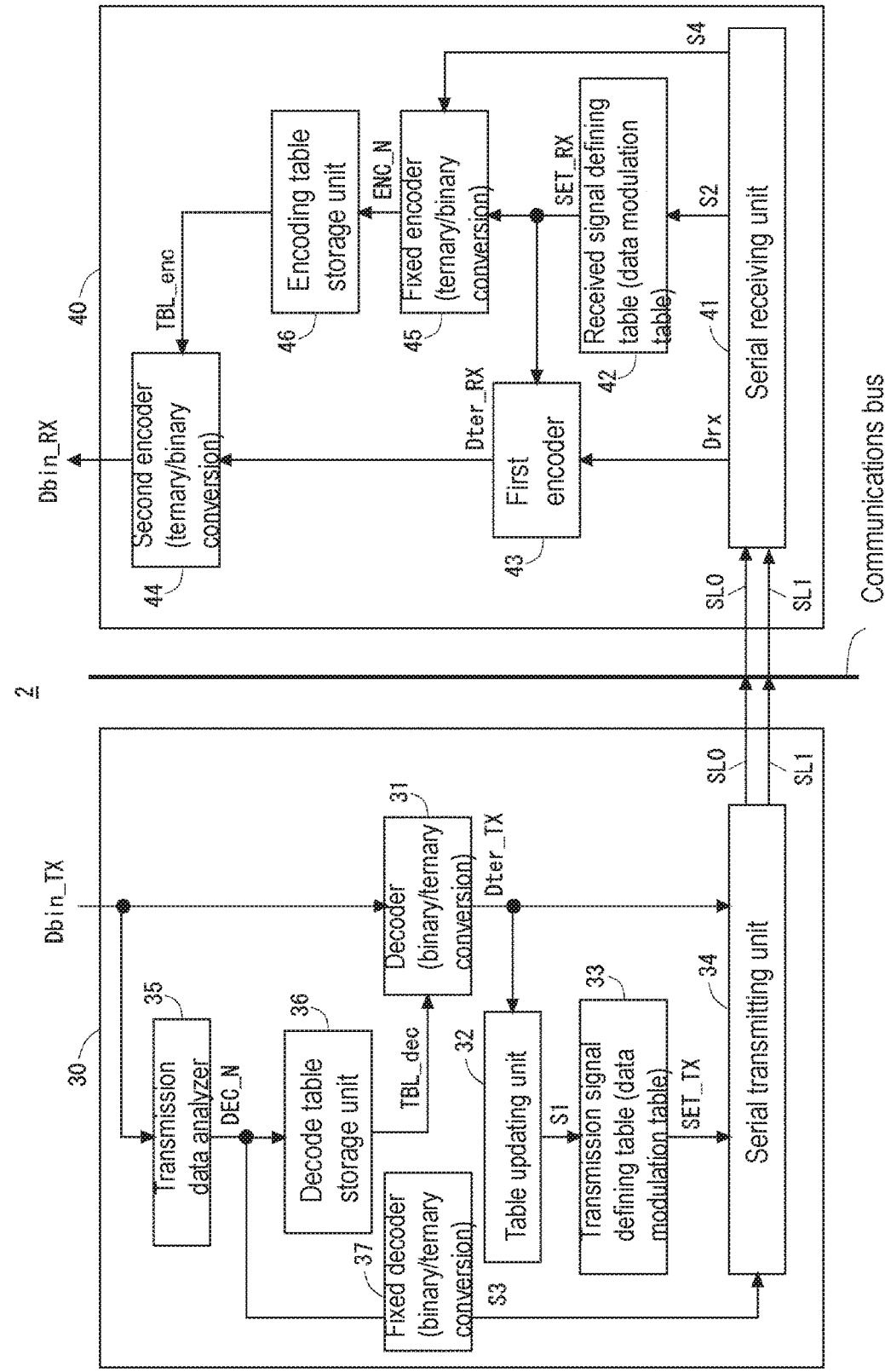
FIG. 10 is a block diagram of a communication system including a semiconductor device according to a second embodiment.

FIG. 10 shows a block diagram of the communication system 2 according to the second embodiment. As shown in FIG. 10, the communication system 2 according to the second embodiment includes the transmission processing circuit 30 in the transmitting device and the reception processing circuit 40 in the receiving device.

The transmission processing circuit 30 includes a decoder 31, a table updating unit 32, a transmitted signal definition table storage unit 33, a Serial transmitting unit 34, a transmission data analyzer 35, a Decode table storage unit 36, and a fixed decoder 37.

The decoders 31 convert binary Transmitted data Dbin_TX into ternary transmitted data Dter_TX. The decoder 31 is supplied with a decode table TBL_dec, and converts a binary number into a ternary number according to a different rule according to the supplied decode table TBL_dec. Details of the decode processing by the decode table TBL_dec and the decoder 31 will be described later.

The table updating unit 32 is the same as the table updating unit 12 according to the first embodiment. The transmitted signal definition table storage unit 33 is the same as the transmitted signal definition table storage unit 13 according to the first embodiment.

The Serial transmitting unit 34 has a function of generating communication data including a decode table code S3 in which a decode table code DEC_N specifying the decode table TBL_dec applied in the decode process for the ternary transmitted data Dter_TX transmitted in the current communication cycle is represented by a ternary number, added to the Serial transmitting unit 14 according to the first embodiment. That is, the communication data generated by the Serial transmitting unit 34 includes the decode table code S3, the modulate table code S1, and the ternary transmitted data Dter_TX.

The transmission data analyzer 35 sets a predetermined number of consecutive values among the values included in the binary transmitted data Dbin_TX as one data group, analyzes the transitions of the values for each data group, and outputs a decode table code DEC_N specifying one of the decode tables included in the plurality of decode tables according to the analysis result. The decoding table specified by the transmission data analyzer 35 will be described in detail later. The Decode table storage unit 36 stores a plurality of decoding tables TBL_dec. Then, the Decode table storage unit 36 outputs the decode table TBL_dec specified by the decode table code DEC_N to the decoder 31.

The fixed decoder 37 converts the decode table code DEC_N represented by a binary number into a decode table code S3 represented by a ternary number according to a predetermined conversion rule.

The reception processing circuit 40 includes a Serial receiving unit 41, a received signal definition table storage unit 42, a first encoder 43, a second encoder 44, and a fixed encoder 45, and an encoding table storage unit 46.

The Serial receiving unit 41 adds a function of extracting the decode table code S3 included in the communication data and outputting the decode table code S4 to the Serial receiving unit 21 according to the first embodiment.

The received signal definition table storage unit 42 is the same as the received signal definition table storage unit 22 according to the first embodiment. The first encoder 43 is the same as the first encoder 23 according to the first embodiment.

The second encoder 44 converts the ternary received data Dter_RX outputted from the first encoder 43 into binary transmitted data Dbin_TX. Here, the second encoder 44 is provided with an encoding table TBL_enc, which converts a binary number to a ternary number by a different rule depending on the given encoding table TBL_enc. Details of the encoding process by the encoding table TBL_enc and the second encoder 44 will be described later.

The fixed encoder 45 converts the decode table code S3 represented by a ternary number into a decode table code ENC_N represented by a binary number according to a predetermined conversion rule. The fixed encoder 45 demodulates the decode table code S4 modulated on the basis of the received signal definition table SET_RX outputted from the received signal definition table storage 42, and converts the demodulated decode table code S4 into a decode table code ENC_N which is a binary number.

The encoding table storage unit 46 stores a plurality of encoding tables TBL_enc. Then, the encode table storage unit 46 outputs the encode table TBL_enc specified by the decode table code ENC_N to the second encoder 44.

Here, a decoding table and an encoding table used in the communication system 2 according to the second embodiment will be described in detail. In the communication system 2 according to the second embodiment, the encoding processing and the decoding processing of the same rules are applied to the ternary transmitted data Dter_TX and the ternary received data Dter_RX transmitted and received in one communication cycle. Therefore, the plurality of decoding tables TBL_dec stored in the Decode table storage unit 36 and the plurality of encoding tables TBL_enc stored in the fixed encoder 45 have substantially the same contents. In the communication system 2 according to the second embodiment, the same translation rules are applied to a pair of ternary transmitted data Dter_TX and ternary received data Dter_RX by transmitting the decoding table DEC_N and the decoding table DEC_N specifying the table from the transmission processing circuit 30 to the reception processing circuit 40.

FIG. 11 is a diagram for explaining examples of the decoding table used in the transmitting device and the encoding table used in the receiving device according to the second embodiment. As shown in FIG. 11, the decode table and the encode table can be represented by one table. In the example shown in FIG. 11, in the decode table and the encode table, a first column in which transitions of consecutive predetermined numbers of values included in one data group of the binary transmitted data Dbin_TX, that is, three values in the example shown in FIG. 11, are described is defined in the left column of the drawing. In addition, the decoding table and the encoding table are defined in the right column of the drawing in the second column in which the ternary symbol representing the ternary number corresponding to the first column is described. Also, the decoding table and encoding table according to the second embodiment define a low toggle region containing a second column in which a ternary symbol is represented by a combination of a first value and a second value (e.g., 0, 1) of a third value (e.g., 0, 1, 2) from a first value representing a ternary transmitted data. In the decoding table and the encoding table according to the second embodiment, a high-toggle area including a second column in which ternary symbols represented by combinations of the first value to the third value (e.g., 0, 1, 2) are described is defined.

In other words, in the case shown in FIG. 11, the ternary symbol expressed by combining 0 and 1 of 0, 1, and 2 is defined in the low toggle region, and the ternary symbol obtained by combining 2 of 3 values of 0, 1, and 2 is defined in the high toggle region. Then, for each of the ternary symbol included in the low toggle region and the ternary symbol included in the high toggle region, a binary transmitted data group represented by combinations of three binary numbers is defined.

In the communication system 2 according to the second embodiment, a plurality of sets of the decode table and the encode table shown in FIG. 11 are prepared. The plurality of tables differ in the combinations of binary data and ternary symbols.

The decode table is stored in the Decode table storage unit 36, and the encode table is stored in the encode table storage unit 46. The tables can be stored in the Decode table storage unit 36 and the encode table storage unit 46 from the outside, for example, in the transmitting device and the receiving device memories. It is also preferable that these tables are stored prior to the initiation of the transmitting device and the receiving device operations or at the time of shipping.

Then, the transmission data analyzer 35 according to the second embodiment gives the decode table code DEC_N indicating the decode table described in the first column corresponding to the low-toggle area to the value of the data group having the higher frequency of occurrence among the successive value transitions included in the data group of the binary transmitted data Dbin_TX to the Decode table storage unit 36.

By creating such a decoding table and an encoding table, for example, a data modulation table can be assigned to which change definition values for toggling only one of the signal lines are assigned, the change definition values being the ternary symbols of the low toggle area. In addition, by analyzing the binary Transmitted data Dbin_TX and selecting a decoding table in which the value of binary transmitted data, which is a frequently appearing value transition, is assigned to a low toggle area, the communication system 2 according to the second embodiment suppresses an increase in the number of toggles of the signal line regardless of the content of the binary transmitted data.

Figure 12:
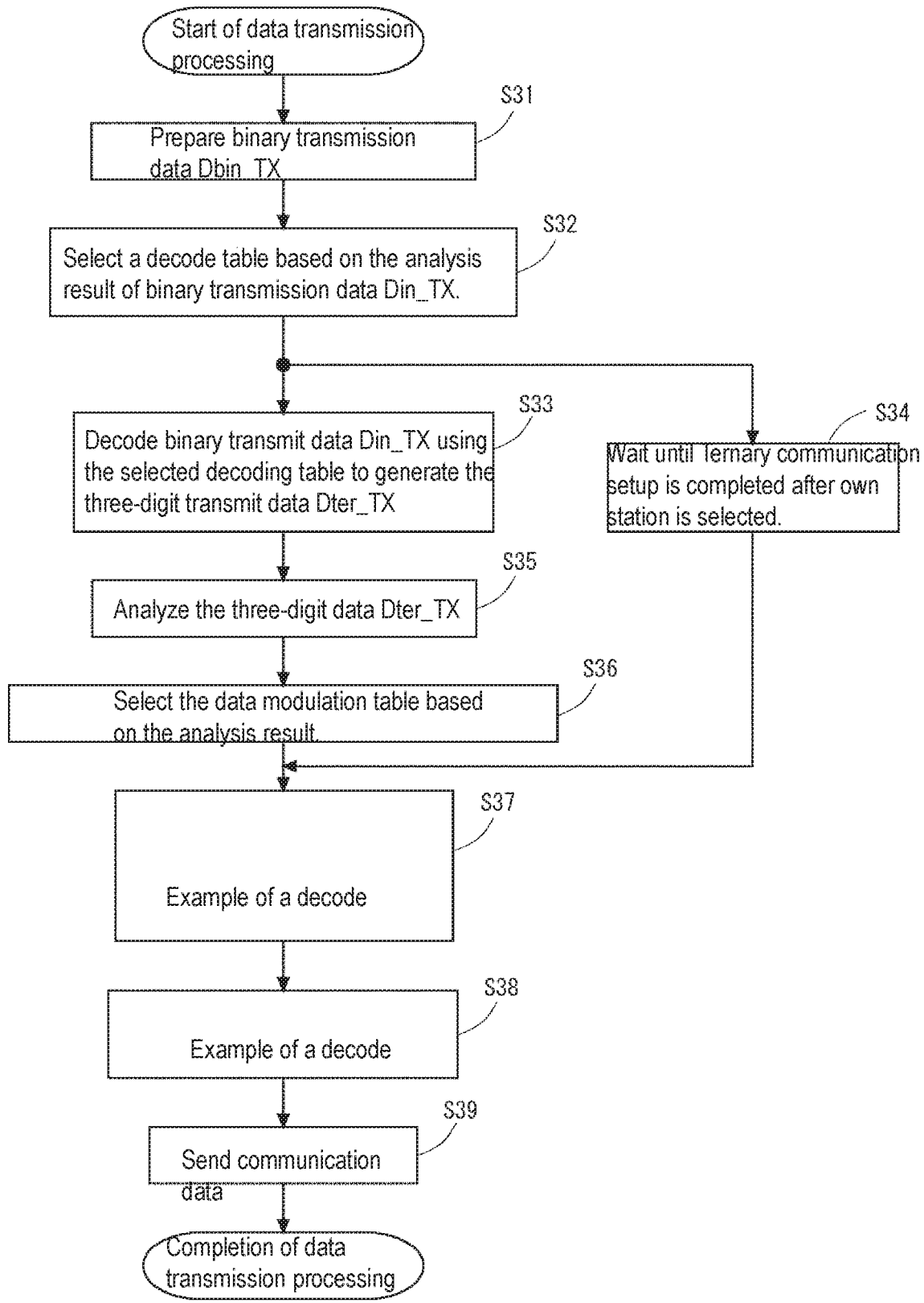
FIG. 12 is a flow chart illustrating a data transmission process according to a transmitting device according to the second embodiment.

Hereinafter, the operation of the communication system 2 according to the second embodiment will be described in detail. FIG. 12 is a flow chart for explaining the data transmitting process in the transmitting device according to the second embodiment.

As shown in FIG. 12, in the transmission processing circuit 30 according to the second embodiment, the binary Transmitted data Dbin_TX to be transmitted is prepared in other circuits for giving the binary transmitted data Dbin_TX to the transmission processing circuit 30 in operation S31. In operation S32, the transmission data analyzer 35 analyzes the binary Transmitted data Dbin_TX and selects a decode table TBL_dec to be supplied to the decoder 31 based on the analysis result. In operation S32, the Transmission data analyzer 35 divides the binary transmitted data Dbin_TX into consecutive predetermined bits (e.g., three bits) to define a data group, and analyzes the transitions of the values of the data group. Then, the transmission data analyzer 35 analyzes the occurrence frequency of the transition state of the value for each data group, and specifies the state transition of the value having the higher occurrence frequency. Then, the transmission data analyzer 35 selects the decode table in which the transitions of the values having a high frequency of occurrence are defined in the low toggle area of the decode table, and outputs the decode table code DEC_N specifying the selected decode table. The Decode table storage unit 36 supplies the decoder 31 with the decode table TBL_dec specified by the decode table code DEC_N supplied from the Transmission data analyzer 35.

Next, the decoder 31 according to the second embodiment generates the ternary transmitted data Dter_TX from the binary transmitted data Dbin_TX using the given decode table TBL_dec in operation S33. Thereafter, the table updating unit 32 analyzes the ternary transmitted data Dter_TX in operation S35. In the analysis of S35, the table updating unit 32 analyzes the value included in the ternary transmitted data Dter_TX to specify the value having the smallest occurrence frequency. In operation S36, the table updating unit 32 selects a data modulation table based on the analysis result. More specifically, the table updating unit 32 selects a data modulation table to which a change-defined value having a large change in the voltage levels of the signal lines (e.g., two signal lines changing in voltage together) is assigned with respect to the value specified in S35, and outputs a modulation table code S1 specifying the selected data modulation table. Then, the transmitted signal definition table storage unit 33 that has received the modulation table code S1 gives the transmitted signal definition table SET_TX specified by the modulation table code S1 to the Serial transmitting unit 34.

In addition, in parallel with the processing in step S33, the fixed decoder 37 converts the decode table code DEC_N represented by binary numbers into the decode table code S3 represented by ternary numbers in step S34.

In operation S37, the Serial transmitting unit 34 generates communication data including the decode table code S3, the modulate table code S1, and the ternary transmitted data Dter_TX. Thereafter, the transmission processing circuit 30 according to the second embodiment waits until the setting of the ternary communication (communication based on the I3C standard) is completed after the local station is selected from the communication buses (S38). In operation S39, after the communication setting is completed, the Serial transmitting unit outputs transmitted signal as the communication data to transmit the communication data.

Figure 13:
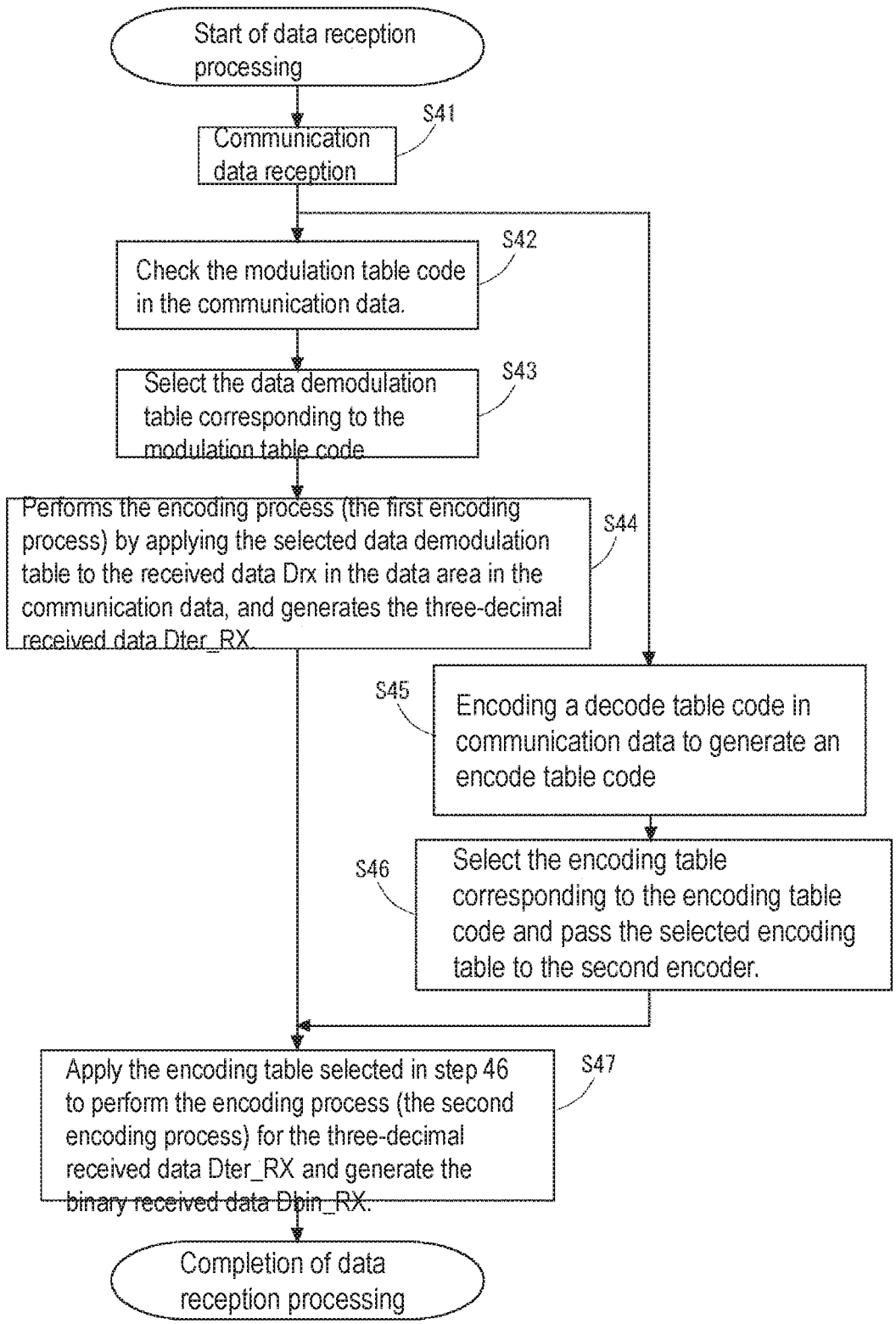
FIG. 13 is a flow chart illustrating a data reception process according to a receiving device according to the second embodiment.

Next, the data reception process in the reception processing circuit 40 according to the second embodiment will be described. FIG. 13 is a flow chart for explaining the data reception process in the reception processing circuit 40 according to the second embodiment.

As shown in FIG. 13, in the reception processing circuit 40 according to the second embodiment, the Serial receiving unit 41 first receives communication data in operation S 41. In operation S42, the Serial receiving unit 41 checks the modulation table code in the communication data. In operation S43, the Serial receiving unit 41 outputs the confirmed modulation table code to the received signal definition table storage unit 42, selects the data demodulation table specified by the modulation table code supplied from the received signal definition table storage unit 42, and outputs the selected data demodulation table to the first encoders 43.

Next, in the reception processing circuit 40 according to the second embodiment, the first encoder 43 performs encoding processing (first encoding processing) on the received data Drx based on the data demodulation table provided in step S43 to generate ternary received data Dter-RX (step S44).

In the reception processing circuit 40 according to the second embodiment, after receiving the communication data in step S41, the Serial receiving unit 41 extracts the decoding table S3 included in the communication data and outputs it to the fixed encoder 45 as the decoding table S4. In step S45, the fixed encoder 45 encodes the decode table code S4 to generate a decode table code ENC_N. The decode table code S3 is stored in the Communication Setting Code Area of the communication data similarly to the modulating table code S1. Therefore, the fixed encoder 45 demodulates the decode table code S4 on the basis of the received signal defining table SET_RX applied in the previous communication cycles, and performs an encoding process on the demodulated decode table code S4 according to rules set in advance to generate the decode table code ENC_N. Thereafter, in step S46, the encode table storage unit 46 supplies the encode table TBL_enc specified by the decode table code ENC_N supplied from the fixed encoder 45 to the second encoder 44.

Then, in the reception processing circuit 40 according to the second embodiment, the second encoder 44 performs encoding processing (second encoding processing) on the ternary received data Dter_RX in accordance with the rules specified by the encoding table TBL_enc to generate binary received data Dbin_RX (S47).

The transmission processing circuit 30 and the reception processing circuit 40 according to the second embodiment perform transmission and reception of data by the operation as described above, thereby establishing communication while switching the decoding method and the modulating method applied to the Transmitted data. Here, waveforms of transmitted signal when the decoding table and the data modulation table are switched in the communication system 2 according to the second embodiment will be described.

In this explanation, in order to explain more clearly the difference caused by switching the decode table according to the content of the binary Transmitted data Dbin_TX to be transmitted, an example in which the default decode table (for example, the decode table shown in FIG. 2) is applied regardless of the content of the binary Transmitted data Dbin_TX will be given as a comparative example.

FIG. 14 is a timing chart of transmitted signal when ternary transmitted data generated by a decoding process using a default decoding table is transmitted by the transmitting device 30 according to the second embodiment. Here, it is assumed that the default decode table is the decode table shown in FIG. 2.

FIG. 15 is a timing chart of transmitted signal when the transmitting device 30 according to the second embodiment transmits the ternary transmitted data generated by the decoding process using the decoding table selected according to the binary transmitted data transition.

Each of the examples shown in FIGS. 14 and 15 is an example in which "0010100010011" is transmitted as the binary Transmitted data Dbin_TX. When the decoding process is performed by applying the default decoding table to the binary transmitted data Dbin_TX (FIG. 14), the ternary transmitted data Dter_TX becomes "01020210". Therefore, since the ternary number having the lowest occurrence frequency is "1", the communication system 2 according to the second embodiment performs communication by selecting the data modulation table B (FIG. 4).

On the other hand, when the decoding process is performed on the binary transmitted data Dbin_TX by applying the decoding table selected according to the status of the data transition (FIG. 15), the ternary transmitted data Dter_TX becomes "01101011". Therefore, since the ternary number having the lowest occurrence frequency is "2", the communication system 2 according to the second embodiment performs communication by selecting the data modulation table C (FIG. 4).

Then, FIG. 14 and FIG. 15 are compared. In the case shown in FIG. 14, when the ternary transmitted data Dter_TX is transmitted, the toggling count of the first signal line SL0 and the toggling count of the second signal line SL1 is 10 times. On the other hand, in the case shown in FIG. 15, when the ternary transmitted data Dter_TX is transmitted, the total number of toggles of the first signal line SL0 and the second signal line SL1 is eight. As described above, in the communication system 2 according to the second embodiment, the communication system 2 performs a decoding process for determining ternary symbols based on only two ternary numbers for data transitions having a higher frequency of occurrence among data transitions of the data string constituting the binary transmitted data Dbin_TX to be transmitted. By setting the ternary transmitted data Dter_TX generated by such a decoding process to transmitted signal, the communication system 2 according to the second embodiment can reduce the sum of the toggles of the first signal line SL0 and the second signal line SL1 as compared with the communication system 1 according to the first embodiment.

Although the invention made by the inventor has been specifically described based on the embodiment, the present invention is not limited to the embodiment already described, and it is needless to say that various modifications can be made without departing from the gist thereof.

What is claimed is:

1. A semiconductor device comprising:
   a circuit that functions as:
      a decoder that converts binary data of a first predetermined length into ternary data of a second predetermined length;
      a transmitted signal definition table storage unit that stores a plurality of signal definition tables defining how to modulate the data according to respective values of the ternary data of the second predetermined length;
      a table updating unit that selects one of the plurality of transmitted signal defining tables based on the second predetermined length of ternary data; and
      a serial transmitting unit that outputs modulated ternary data generated by modulating the ternary data of the second predetermined length on the basis of one of the plurality of transmitted signal definition tables and one of the plurality of transmitted signal definition tables.

2. The semiconductor device according to claim 1, wherein the plurality of transmitted signal definition tables is configured so that logical levels of the ternary data change more when a frequency of occurrence of each of the ternary values representing the ternary data is the lowest value, and
   wherein the table updating unit selects one of the plurality of transmitted signal definition tables based on a change definition value, which is a value having the lowest occurrence frequency among ternary values representing the ternary data, and provides the selected one to the serial transmitting unit.

3. The semiconductor device according to claim 2, wherein the serial transmitting unit generates communication data including a communication setting code area for storing a modulation table code indicating the transmitted signal definition table given to the serial transmitting unit, and a data area for storing the ternary data.

4. The semiconductor device according to claim 1, wherein the circuit further functions as:
   a decode table storage unit that stores a plurality of decoding tables; and
   a transmission data analyzer that defines a predetermined number of consecutive values among the values included in the binary data as one data group, analyzes a transitions of values for each data group, and outputs a decode table code specifying one of decode tables included in the plurality of decode tables in accordance with an analysis result,
   wherein each of the decode tables of the plurality of decode tables includes:
      a first column that describes the transitions of consecutive values of the same number as a number of the consecutive values contained in a set of data in the binary transmitted data;
      a second column in which ternary symbols representing a third decimal number corresponding to the first column are described;
      a low toggle area including the second column describing the ternary symbols represented by combinations of first and second values of the first to third values representing the ternary transmitted data; and
      a high toggle area comprising the second column describing the ternary symbols represented by combinations of the first to third values,
   wherein the transmission data analyzer provides the decode table code indicating the decode table described in the first column in which a value of a data group having a high frequency of occurrence among transitions of consecutive values included in the data group corresponds to the low toggle area to the decode table storage unit,
   wherein the decode table storage unit provides the decoder with the decode table indicated by the decode table code outputted by the transmission data analyzer, and
   wherein the decoder converts the binary transmitted data into the ternary transmitted data based on the decode table provided from the decode table storage unit.

5. The semiconductor device according to claim 4, wherein the decoding table code has a fixed decoder that converts the decoding table code to a ternary number based on a predetermined rules.

6. The semiconductor device according to claim 1, wherein the serial transmitting unit outputs the binary transmitted data from a first terminal and a binary transmitted data synchronous clock signal from a second terminal when the binary transmitted data is output from the first terminal and the second terminal.

7. A semiconductor device comprising:
   a circuit that functions as:
      a received signal definition table storage unit that stores a plurality of received signal definition tables defining procedures for generating modulated ternary data from ternary data of a first predetermined length;
      a serial receiving unit that receives communication data including the modulated ternary data and a first received signal definition table used for generating the modulated ternary data from the plurality of received signal definition tables, and transmits the received communication data to circuits at a subsequent stage;
      a first encoder that converts the modulated ternary data into the first predetermined length of ternary data based on the first received signal definition table; and
      a second encoder that converts the first predetermined length of ternary data into second predetermined length of binary data.

8. The semiconductor device according to claim 7, wherein the communication data includes a modulation table code specifying a transmitted signal definition table defining the generation procedures of the modulation ternary data, and the modulation ternary data, and
   wherein the received signal definitions table storage unit, stores the received signal definition table used in a transmitting device and corresponding to the modulation ternary data and the transmitted signal definition table specified by the modulation table code, and transmits the received signal defining table specified by the modulating table code to the first encoder.

9. The semiconductor device according to claim 8, wherein the received signal definition table storage unit determines the modulation table code received in a current communication cycle based on translation rules described in the received signal definition table specified in the modulation table code received in a previous communication cycle.

10. The semiconductor device according to claim 7, wherein the circuit further functions as:
   a fixed encoder that converts a decode table code included in the communication data and represented by ternary values into an encoding table code represented by a binary number; and
   an encoding table storage unit that stores a plurality of encoding tables and outputting an encoding table specified by the encoding table code,
   wherein each of the plurality of encoding tables includes the same content as a plurality of decoding tables used in a transmitting device, and each of the plurality of encoding table codes describes the same content as the decoding table specified by the same code, and
   wherein the second encoder converts the ternary data into binary data in accordance with the encoding table supplied from the encoding table storage unit.

11. The semiconductor device according to claim 10, wherein the communication data includes a modulation table code indicating a transmitted signal definition table defining signal change patterns of a transmitted signal, and the ternary data,
   wherein the received signal definition table storage unit outputs the received signal definition table specified by the modulated code table received in a previous communication cycle until the reception of the ternary data in a current communication cycle is started, and
   wherein the fixed encoder determines the decode table code included in the communication data and represented by the ternary value according to the received signal definition table outputted from the received signal definition table storage unit, and converts the determined decode table code into a binary value, thereby outputting the encode table code.

12. A communication system comprising:
   a transmitting device; and
   a receiving device that receives signals transmitted from the transmitting device, wherein the transmitting device comprises a first circuit that functions as:
- a decoder that converts binary data of a first predetermined length into ternary data of a second predetermined length;
- a transmitted signal definition table storage unit in which a plurality of transmitted signal definition tables defining how to modulate the second predetermined length of ternary data are stored;
- a table updating unit that selects one of the plurality of transmitted signal defining tables based on the second predetermined length of ternary data; and
- a serial transmitting unit that outputs modulated ternary data generated by modulating the ternary data of the second predetermined length based on one of the plurality of transmitted signal definition tables and one of the plurality of transmitted signal definition tables, wherein the receiving device comprises a second circuit that functions as:
- a received signal definition table storage unit that stores a plurality of received signal definition tables corresponding to each of the transmitted signal definition tables;
- a serial receiving unit that receives communication data including the modulated ternary data and a first received signal definition table corresponding to the plurality of transmitted signal definition tables used for generating the modulated ternary data from the plurality of received signal definition tables and transmitting the received communication data to circuits at a subsequent stage;
- a first encoder that converts the modulated ternary data into the second predetermined length of ternary data based on the first received signal definition table; and
- a second encoder that converts the second predetermined length of ternary data into the first predetermined length of binary data.

* * * * *